(12) United States Patent
Mack et al.

(10) Patent No.: US 7,998,601 B2
(45) Date of Patent: Aug. 16, 2011

(54) SANDWICH THERMAL INSULATION LAYER SYSTEM AND METHOD FOR PRODUCTION

(75) Inventors: Daniel Emil Mack, Dueren (DE);
Sonja-Michaela Gross, Aachen (DE);
Robert Vassen, Herzogenrath (DE);
Detlev Stoever, Nierderzier (DE)

(73) Assignee: Forschungszentrum Juelich GmbH, Juelich (DE)

( * ) Notice: Subject to any disclaimer, the term of this patent is extended or adjusted under 35 U.S.C. 154(b) by 463 days.

(21) Appl. No.: 12/083,173

(22) PCT Filed: Oct. 17, 2006

(86) PCT No.: PCT/DE2006/001837
§ 371 (c)(1),
(2), (4) Date: May 22, 2008

(87) PCT Pub. No.: WO2007/045225
PCT Pub. Date: Apr. 26, 2007

(65) Prior Publication Data
US 2009/0110904 A1   Apr. 30, 2009

(30) Foreign Application Priority Data

Oct. 20, 2005 (DE) .......................... 10 2005 050 661

(51) Int. Cl.
*B32B 15/00* (2006.01)
*B32B 17/00* (2006.01)
*B05D 3/00* (2006.01)

(52) U.S. Cl. ............ 428/699; 428/304.4; 428/426; 428/432; 428/448; 428/450; 428/469; 428/472.2; 428/697; 428/701; 428/702; 427/264; 427/269; 427/270; 427/271; 427/283; 427/348; 427/372.2; 427/397.8; 427/419.1; 427/419.2; 427/419.6

(58) Field of Classification Search .................. None
See application file for complete search history.

(56) References Cited

U.S. PATENT DOCUMENTS

| 4,104,442 A | 8/1978 | Sussmuth |
| 5,161,306 A | 11/1992 | Nakahira et al. |
| 2003/0148148 A1 | 8/2003 | Dietrich et al. |
| 2003/0152814 A1 | 8/2003 | Gupta et al. |

FOREIGN PATENT DOCUMENTS

| DE | 25 44 437 | 4/1977 |
| DE | 196 50 704 | 6/1998 |
| DE | 198 52 285 | 4/2000 |
| DE | 100 08 861 | 9/2001 |
| EP | 1 141 437 | 10/2001 |
| EP | 1 514 953 | 3/2005 |
| EP | 1 645 363 | 4/2006 |
| WO | WO-93/01317 | 1/1993 |
| WO | WO-00/29634 | 5/2000 |
| WO | WO-01/63006 | 8/2001 |

*Primary Examiner* — Ling Xu
(74) *Attorney, Agent, or Firm* — Jordan and Hamburg LLP

(57) ABSTRACT

A method produces thermal barrier coatings that adhere to components even at high temperatures and temperatures that change frequently. A gas-tight glass-metal composite coating is applied to the component and annealed. The corroded part of the gas-tight coating is then removed, and a second, porous coating is applied. The second coating can comprise a ceramic, in particular yttrium-stabilized zirconium oxide. A thermal barrier coating is provided that is a composite made of a gas-tight glass-metal composite coating and another porous coating disposed thereover. Because the boundary volume of the composite coating is partly crystallized to the other coating, superior adhesion within the composite is achieved. Thus, it is in particular possible to produce a composite made of silicate glass-metal composite coatings and yttrium-stabilized zirconium oxide that are temperature-stable for extended periods of time. Such a composite is particularly advantageous for use as a thermal barrier coating because it combines good protection against oxidation with low heat conductivity and susceptibility to aging.

40 Claims, No Drawings

SANDWICH THERMAL INSULATION LAYER SYSTEM AND METHOD FOR PRODUCTION

BACKGROUND OF THE INVENTION

The invention relates to multi-layer thermal barrier coating systems and to a method for producing them.

Increasingly higher gas temperatures are sought in stationary and airborne gas turbines in order to increase the efficiency of these machines. For this reason, turbine components are provided with thermal barrier coatings that generally comprise yttrium-stabilized zirconium oxide (YSZ).

It is disadvantageous that such porous ceramics are porous for oxygen. A bonding agent coating, made of an MCrAlY alloy; iron, cobalt, or nickel being employed for the metal M, or made of an aluminide, protects the substrate from oxidation and simultaneously improves the adhesion of the ceramic coating. Surface temperatures on the components today can reach up to 1200° C. during continuous operation.

It is a disadvantage that, when there is rapid and frequent heating and cooling of the coatings, stresses occur due to different thermal expansion coefficients, and these stresses can lead to damage and to failure of the joint.

Frequently, thermal barrier coating systems fail in the vicinity of the bonding agent coating where the stresses are locally amplified by special geometric relationships due to the interface roughness.

This effect is amplified when an oxide coating forms between the bonding agent coating and the thermal barrier coating and the oxide coating has drastically less plasticity and a lower expansion coefficient than the bonding agent coating. This leads to spalling of the ceramic thermal barrier coating when the oxide coating attains a critical thickness.

A thermal barrier coating is known from DE 198 52 285 C1 that is made of a glass-metal/ceramic composite and that is gas-tight and thus can also prevent formation of an oxide coating. However, the corrosion and aging susceptibility of the composite in oxidizing atmospheres at temperatures above approximately 1000° C. significantly limits employment of these composites as thermal barrier coatings. Moreover, these composites are substantially more heat-conductive than YSZ, for instance, so that much greater coating thickness is required to attain an equivalent thermal barrier.

A thermal barrier coating is also known from DE 100 08 861 A1, which comprises a composite made of YSZ or a glass-metal composite coating that is 50-100 µm thick and another coating disposed thereover that has significantly lower thermal conductivity and higher temperature stability. It is a disadvantage that the adhesion within this composite is inadequate. As a rule, the coatings fail first at the interface between the composite coating and the coating disposed thereover. However, they can also fail within the composite coating.

The object of the invention is to provide a method with which it is possible to produce thermal barrier coatings that have a better service life at high operating temperatures than the prior art. The object of the invention is furthermore to provide a component having a temperature-resistant and aging-resistant thermal barrier coating.

SUMMARY OF THE INVENTION

The objects are attained using a method and a component in accordance with the invention An improved method for producing a thermal barrier coating on a component was developed in the framework of the invention. A gas-tight first coating is applied to the component. In particular, suitable for the material for the gas-tight coating, is a glass-metal composite, the gas-tightness being effected primarily by the glass. The gas-tight coating is annealed in an oxidizing atmosphere. Then part of the gas-tight coating is removed.

Finally, a second, porous coating is applied to the gas-tight coating. A ceramic, for instance yttrium-stabilized zirconium oxide, is particularly suitable for the material for the porous coating. Such ceramics have particularly low thermal conductivity so that the second coating, as the actual thermal barrier coating, requires only a small thickness.

It was recognized that removing part of the gas-tight coating significantly improves the adhesion properties between the gas-tight coating and the porous coating. When annealing in air, especially for gas-tight glass-metal composite coatings at temperatures greater than 800° C., there is major corrosion of the composite material to a depth of approx. 70 µm from the surface. Regardless of this, there is simultaneously some crystallization of the deeper composite coatings. Normally, there is not adequate adhesion for the porous coating on the corroded gas-tight coating. The inventive removal of the corroded part of the gas-tight coating thus makes it possible to produce thermal barrier coatings as a composite that is made of a gas-tight coating and a porous coating and that cannot be created with adequate quality using to the prior art.

Using the inventive method, it is in particular possible to create thermal barrier coatings that combine the advantages of a glass-metal composite material and a ceramic. The gas-tight composite material protects the substrate from oxidation. The porous ceramic has significantly lower heat conductivity than the composite material and requires a significantly thinner coating thickness than a thermal barrier coating comprising pure composite material. Using the porous ceramic, the composite material disposed thereunder is also protected from corrosion and aging under application conditions due to the reduction in temperature within the coating system cooled on the substrate side. This is true in particular during operation in oxidizing atmospheres and at temperatures greater than 1000° C.

An alkali silicate glass is suitable for the glass for the gas-tight coating and in this case in particular a glass with the following composition: $R_2O$—5-30 wt. %, TO—5-30 wt. %, $Al_2O_3$—0-20 wt. %, Si—remainder. R represents one or more elements from the group Li, Na, K, Rb, Cs, and T stands for one or more elements from the group Mg, Ca, Sr, Ba. Such glasses have particularly low heat conductivity. In addition, by varying the composition, it is possible to adjust the thermal expansion coefficient of the lower area in a broad range from $11 \cdot 10^{-6}$ $K^{-1}$ to $13 \cdot 10^{-6}$ $K^{-1}$. Thus, it is possible to reduce thermal stresses between the lower area and the component, or between the lower area and the upper area of the thermal barrier coating. Such stresses could result in spalling of the entire thermal barrier coating from the component, or spalling of the upper area of the thermal barrier coating from its lower area. The stress responsible for the spalling can be reduced at locations having a small radius of curvature.

An alkali-free base glass, in particular base glasses having 25-55 wt. % $SiO_2$, 0-25 wt. % CaO and/or MgO, 0-15 wt. % $Al_2O_3$, 0-50 wt. % BaO and a total of 0-15 wt. % admixtures of for instance $B_2O_3$, $La_2O_3$ and MnO, are suitable for the glass. The use of alkali-free base glasses is suitable for minimizing the risk of a critical corrosion forming in the metal coatings in connection with the sulfurous hot gas.

A glass-metal composite material advantageously selected as the material for the gas-tight coating contains an alloy having the composition MCrAlY, with iron, cobalt, or nickel for the metal M. This composite material adheres particularly well to super-alloys from which for instance turbine components are produced.

In one advantageous embodiment of the invention, the annealing occurs at temperatures above 800° C. This ensures that the corroded coating to be subsequently removed forms within a period of time that is acceptable for mass production.

In contrast, in one alternative embodiment of the invention, the annealing occurs at lower temperatures that are less than 1000° C., preferably less than 850° C. This can be necessary for instance when the component to be provided with the thermal barrier coating comprises a material that is not temperature-resistant. Examples of such components are components of steam turbines, internal combustion engines, and steel tubes that are intended for hot gases to pass through. The material composition in this case should be selected such that the corroded coating to be removed forms as rapidly as possible despite the reduced annealing temperature.

The gas-tight coating must be removed at least to the extent that its corroded part is completely removed. The depth of the corrosion into the gas-tight coating during annealing is itself a function of its precise composition and of the parameters for the annealing process. One skilled in the art can estimate the depth of the corrosion or determine it using suitable measuring methods, for instance using microscopic examination of a transverse section. However, one skilled in the art can also determine the required depth to which the gas-tight coating must be removed in a reasonable number of experiments. Generally it should be assumed that the gas-tight coating will corrode to at least a depth of 30 µm; therefore at least 30 µm of the gas-tight coating should be removed.

The removal can be performed for instance by mechanical machining. Proven techniques that can also be employed in mass production are available for this.

In one advantageous embodiment of the invention, the removal is performed by blasting the surface with particles. Both the removal rate and the resultant surface roughness can be controlled particularly well with this machining method.

In another advantageous embodiment of the invention, roughness of 4 µm or more is added to the surface of the gas-tight coating prior to the porous coating being applied. This further increases the adhesion between gas-tight coating and porous coating. This is particularly important when the porous coating is to be applied by means of a thermal spraying process. Such spraying processes require a minimum roughness on the surface that is to be coated.

As an option, an adhesive coating can be applied to the component prior to production of the thermal barrier coating in order to improve the durability of the thermal barrier coating. This reduces the risk that the entire thermal barrier coating will be removed from the component due to spalling. A coating of bonding agent that contains aluminum and in this case in particular a coating having the composition MCrAlY, with iron, cobalt, or nickel for the metal M, or even an aluminide coating, is suitable for this. Such coatings adhere particularly well to metals, in particular to super alloys that are used to produce turbine components and similar components that are subjected to high temperatures.

In one particularly advantageous embodiment of the invention, a barrier coating that is impermeable for aluminum is added between bonding agent coating and gas-tight coating. It prevents aluminum from migrating from the bonding agent coating into the gas-tight coating, especially in the case of gas-tight coatings that contain a glass-metal composite. Such aluminum depletion results in irreversible weakening of the bonding agent coating, and it should therefore be limited as much as possible.

A barrier coating made of aluminum oxide is preferably selected. Such a barrier coating can be produced in a particularly simple manner since the bonding agent coating already contains the starting material, aluminum. In particular the barrier coating can be produced by annealing the bonding agent coating in an oxidizing atmosphere. This type of production is particularly suitable because no other reagents are required apart from air, which is present in any event. In the interest of forming the barrier coating as rapidly as possible, the bonding agent coating is preferably annealed at temperatures greater than 1000° C.

In the framework of the invention it was recognized that a thermal barrier coating that is disposed on the surface of a component and that has novel structural features has a better service life at high operating temperatures than thermal barrier coatings from the prior art. Such a thermal barrier coating, which can be produced for instance using the aforesaid method, includes a lower and an upper area, the lower area being disposed between the component and the upper area. The lower area entirely or primarily comprises a composite material that comprises glass with metal or glass ceramic with metal. A silicate glass or an alkali-free base glass is particularly suitable for the glass, and a glass ceramic based on the components BaO, CaO, $Al_2O_3$ and $SiO_2$ is particularly suitable for the glass ceramic. The upper area comprises a material that is less heat-conductive than the material in the lower area. In particular selecting a suitable material can be used to embody the upper area such that it acts as the actual thermal barrier coating. The upper porous area can in especially also be embodied as a graded coating or as a multi-layer coating.

It was recognized that the adhesion between the lower area and the upper area can be improved significantly in that the volume of the lower area that is near the surface and faces the upper area (boundary volume) is crystalline, at least in part. The amorphous portion of the lower area should be between 5 and 60 volume percent. The upper area can then advantageously comprise a porous ceramic that would normally tend to adhere very poorly to the lower area. The ceramic can, in particular, be yttrium-stabilized zirconium oxide. The partial crystallization reduces the aging of the glass/glass ceramic-metal coating and thus improves the adhesion of the upper area to the lower area.

Thus, due to the boundary volume that is at least partly crystalline, it is possible to combine the advantages of the composite material and the ceramic in the thermal barrier coating: the gas-tight composite material protects the substrate from oxidation. The porous ceramic is significantly less heat conductive than the composite material. It requires significantly less layer thickness than a thermal barrier coating that comprises pure composite material and it also protects the composite material from corrosion promoted by aging and temperature under application conditions by reducing the temperature in the lower area of the component cooled on the substrate-side. This applies especially during operations in oxidizing atmospheres and at surface temperatures greater than 1000° C.

The composite material advantageously contains an alloy having the composition MCrAlY, with iron, cobalt, or nickel as metal the M. Because of this, it adheres particularly well to metals, in particular to super alloys, that are used to produce turbine components.

In one particularly advantageous embodiment of the invention, the roughness of the interface is greater than 4 µm between the lower area and the upper area. Because of this, the adhesion between the upper area and the lower area is further increased, in particular when the upper area is applied by means of a thermal spraying method. Such spraying methods have minimum roughness requirements for the surface that is to be coated.

The roughness can be added, for instance, using mechanical processing or even by blasting the interface with particles. Alternatively, the roughness can also be set when the lower area is produced, for instance in that a thermal spraying method is used for producing this area. The resultant roughness can be controlled particularly well using the process parameters when applying coatings by means of thermal spraying methods.

The composite material in the lower area can contain an alkali silicate glass and in this case in particular a glass having the following composition: $R_2O$—5-30 wt. %, TO—5-30 wt. %, $Al_2O_3$—0-20 wt. %, Si—remainder. R stands for one or more elements from the group Li, Na, K, Rb, Cs, and T represents one or more elements from the group Mg, Ca, Sr, Ba. Silicate glasses, in particular having the aforesaid composition, have particularly low heat conductivity. In addition, the thermal expansion coefficient of the lower area can be adjusted in a broad range from $11 \cdot 10^{-6} K^{-1}$ to $13 \cdot 10^{-6} K^{-1}$ by varying the composition. Thus, thermal stresses that are between the lower area and the component, or between the lower area and the upper area, and that might result in spalling of the thermal barrier coating, can be reduced in areas that have a small radius of curvature.

The composite material can also contain a glass ceramic, in particular based on the components BaO, CaO, $Al_2O_3$ and $SiO_2$, or an alkali-free base glass, in particular a base glass having 25-55 wt. % $SiO_2$, 0-25 wt. % CaO, 0-15 wt. % $Al_2O_3$, 0-50 wt. % BaO and total 0-15 wt. % admixtures of for instance B2O3, $La_2O_3$ and MnO. Admixtures of ZnO, PbO and $V_2O_5$ in the glass ceramic also make sense because they are effloresced and therefore immobile. They can influence the crystallization properties of the glass ceramic, for instance. The base glass or the glass ceramic advantageously contains 1 wt. % $Al_2O_3$ or less, in particular 0.5 wt. % $Al_2O_3$ or less.

This and other crystallizing glasses offer the advantage that they form a partly crystalline boundary volume particularly rapidly so that in favorable circumstances no corroded area occurs that would have to be removed.

For improving its durability, the thermal barrier coating can be disposed on a bonding agent coating that reduces the risk of the thermal barrier coating spalling from the substrate. The bonding agent coating advantageously contains aluminum; in particular it can be a coating having the composition MCrAlY, with iron, cobalt, or nickel for the metal M. Such coatings have the advantage that they adhere particularly well to those alloys that are used to produce turbine components.

A barrier coating that is impermeable for aluminum is disposed between the bonding agent coating and the thermal barrier coating. This prevents aluminum from migrating into the composite material from the bonding agent coating. Suppressing this aluminum depletion prevents the bonding agent coating from being progressively weakened over time by the mere presence of the composite material, especially at high operating temperatures.

The barrier coating is advantageously aluminum oxide, which is particularly simple to produce, for instance using suitable annealing of the bonding agent coating in air.

It was recognized that a thermal barrier coating that can be produced using the inventive method has additional advantages. It can also be produced cost effectively with reproducible quality in quantities required for mass production. Furthermore, with the materials and process parameters used there is enough flexibility to customize the coating to the application. In particular the thermal expansion coefficients can be varied such that the risk of the coating spalling is reduced under different thermal loads.

DETAILED DESCRIPTION OF THE INVENTION

The subject-matter of the invention shall be described in greater detail in the following using exemplary embodiments, but this shall not limit the subject-matter of the invention.

Example 1

The substrate comprises a super alloy IN738. A 50-200 μm-thick MCrAlY alloy is applied thereto as a bonding agent coating (bond coat). The elements cobalt and nickel were selected for the metal M. The alloy of the bonding agent coating specifically comprises 33 wt. % cobalt, 27 wt. % chromium, 31 wt. % nickel, 8 wt. % aluminum, 0.5 wt. % yttrium, and an admixture of 0.5 wt. % silicon. A superficial, dense aluminum oxide barrier coating, approximately 2 μm in thickness is produced on the MCrAlY coating by annealing in air for 18 hours at 1050° C.

A metal-glass composite coating having 63 wt. % metal and 37 wt. % glass is applied to the aluminum oxide coating as a gas-tight coating. The alloy used in the bonding agent coating is used for the metal. The glass is an alkali-lime silicate glass, 70 wt. % $SiO_2$, 17 wt. % $Na_2O$, 8 wt. % CaO, 2 wt. % MgO and 3 wt. % $Al_2O_3$. The gas-tight coating is first produced with a thickness of approx. 150-300 μm. Then the component is annealed in air for 24-48 hours at 950° C. This results in corrosion of the composite to a depth of approximately 70 μm from the surface. At the same time, the deeper composite coatings crystallize in part.

The corrosion coating of the metal-glass composite is removed using particle blasting. This simultaneously roughens the surface. Then a porous ceramic coating, approx. 250-350 μm in thickness and made YSZ, that provides most of the barrier effect for the entire thermal barrier coating, is applied to the remaining, part crystalline composite coating, which is approximately 50-250 μm in thickness. The roughening improves the adhesion of the ceramic coating to the metal-glass composite.

Example 2

The method proceeds, as in Example 1, up to production of the barrier coating. Then a metal-glass ceramic composite coating having 53 wt. % metal and 47 wt. % glass ceramic is applied as the gas-tight coating. The alloy for the bonding agent coating is again used for the metal. The glass ceramic is an alkali-free base glass having 47 wt. % $SiO_2$, 16 wt. % CaO, 37 wt. % BaO, and 0.5 wt. % $Al_2O_3$. The gas-tight coating is applied with a thickness of approximately 50-250 μm and the component is annealed at a temperature of 950° C. for 10 h (oxygen excluded) such that the glass ceramic component of the composite largely crystallizes. The ceramic coating of YSZ is applied directly to the partly crystallized composite coating in a thickness of 250-350 μm without a corroded portion of the coating being removed first.

The invention claimed is:
1. A method for producing a thermal barrier coating system on a component, comprising:
  forming an aluminum oxide barrier coating on the component;
  applying a gas-tight coating made of a glass-metal composite to the aluminum oxide barrier coating;

annealing said gas-tight coating in an oxidizing atmosphere and simultaneously crystallizing at least a portion of deeper parts of said gas-tight coating;

removing a part of the gas-tight coating following said annealing; and applying a porous coating to a remaining part of said gas-tight coating.

2. A method according to claim 1, wherein said gas-tight coating includes an alkali silicate glass.

3. A method according to claim 2, wherein said alkali silicate glass has a composition of 5-30 wt. % $R_2O$, 5-30 wt. % TO, 0-20 wt. % $Al_2O_3$, and the remainder Si, wherein R represents one or more elements from the group consisting of Li, Na, K, Rb and Cs, and T represents one or more elements selected from the group consisting of Mg, Ca, Sr and Ba.

4. A method according to claim 1, wherein said removing a part of the gas-tight coating includes removing at least 30 μm of the gas-tight coating.

5. A method according to claim 1, wherein said removing the part of the gas-tight coating is performed by mechanical machining.

6. A method according to claim 1, wherein said removing the part of the gas-tight coating is performed by blasting with particles.

7. A method according to claim 1, wherein said gas-tight coating includes an alkali-free base glass.

8. A method according to claim 7, wherein said alkali-free base glass has a composition of 25-55 wt. % $SiO_2$, 0-25 wt. % CaO, 0-15 wt. % $Al_2O_3$, 0-50 wt. % BaO, and total 0-15 wt. % admixtures.

9. A method according to claim 8, wherein said admixtures include at least one component selected from the group consisting of $B_2O_3$, $La_2O_3$ and MnO.

10. A method according to claim 1, wherein said gas-tight coating includes a glass-metal composite material having a composition MCrAlY, wherein M represents a metal selected from the group consisting of iron, cobalt and nickel.

11. A method according to claim 1, wherein the porous coating includes a ceramic material.

12. A method according to claim 11, wherein said ceramic material includes yttrium-stabilized zirconium oxide.

13. A method according to claim 1, wherein said annealing the gas-tight coating is conducted at least one temperature greater than 800° C.

14. A method according to claim 1, wherein said annealing the gas-tight coating is conducted at least one temperature less than 1000° C.

15. A method according to claim 14, wherein said annealing the gas-tight coating is conducted at least one temperature less than 850° C.

16. A method according to claim 1, further comprising adding roughness of 4 μm or more to a surface of the gas-tight coating prior to said applying the porous coating.

17. A method according to claim 1, wherein said forming the aluminum oxide barrier coating includes applying a bonding agent coating that includes aluminum to the component and annealing said bonding agent coating at least one temperature greater than 1000° C.

18. A method according to claim 17, wherein said bonding agent coating has a composition MCrAlY, wherein M represents a metal selected from the group consisting of iron, cobalt and nickel.

19. A method according to claim 17, wherein said bonding agent coating includes an aluminide coating.

20. A multi-layer thermal barrier coating system for a component, comprising:

a thermal barrier coating including a first layer and a second layer; and an aluminum oxide barrier coating being disposed between the component and the thermal barrier coating, said first layer being disposed between the aluminum oxide barrier and said second layer, said first layer being gas-tight and being comprised substantially or entirely of a glass-metal composite material, said second layer comprising a porous material, a volume of said first layer being at least partially crystalline.

21. A multi-layer thermal barrier coating system according to claim 20, wherein said second layer is comprised of a material that has lower thermal conductivity than an other material comprising said first layer.

22. A multi-layer thermal barrier coating system according to claim 20, wherein said glass-metal composite material includes an alloy having a composition MCrAlY, wherein M represents a metal selected from the group consisting of iron, cobalt and nickel.

23. A multi-layer thermal barrier coating system according to claim 20, wherein a glass component in said glass-metal composition includes an alkali-silicate glass.

24. A multi-layer thermal barrier coating system according to claim 23, wherein said alkali silicate glass has a composition of 5-30 wt. % $R_2O$, 5-30 wt. % TO, 0-20 wt. % $Al_2O_3$, and a remainder Si, wherein R represents one or more elements selected from the group consisting of Li, Na, K, Rb and Cs, and T represents one or more elements selected from the group consisting of Mg, Ca, Sr and Ba.

25. A multi-layer thermal barrier coating system according to claim 20, further comprising a mechanically machined interface between said first and second layers.

26. A multi-layer thermal barrier coating system according to claim 25, wherein said interface is produce by being blasted with particles.

27. A multi-layer thermal barrier coating system according to claim 20, wherein a glass component in said glass-metal composite material includes a glass ceramic based on at least one component selected from the group consisting of BaO, CaO, $Al_2O_3$ and $SiO_2$.

28. A multi-layer thermal barrier coating system according to claim 27, wherein said glass ceramic includes an alkali-free base glass.

29. A multi-layer thermal barrier coating system according to claim 28, wherein said alkali-free base glass has a composition of 25-55 wt. % $SiO_2$, 0-25 wt. % CaO and/or MgO, 0-15 wt. % $Al_2O_3$, 0-50 wt. % BaO, and total 0-15 wt. % admixtures.

30. A multi-layer thermal barrier coating system according to claim 29, wherein said admixtures include at least one component selected from the group consisting of $B_2O_3$, $La_2O_3$ and MnO.

31. A multi-layer thermal barrier coating system according to claim 27, wherein said glass ceramic includes 1 wt. % or less of $Al_2O_3$.

32. A multi-layer thermal barrier coating system according to claim 31, wherein said glass ceramic includes 0.5 wt. % or less $Al_2O_3$.

33. A multi-layer thermal barrier coating system according to claim 20, further comprising a bonding agent coating being disposed between the component and the thermal barrier coating.

34. A multi-layer thermal barrier coating system according to claim 33, wherein said bonding agent coating includes aluminum.

35. A multi-layer thermal barrier coating system according to claim 34, wherein said bonding agent coating has a composition of MCrAlY, wherein M represents a metal selected from the group consisting of iron, cobalt and nickel.

36. A multi-layer thermal barrier coating system according to claim 34, wherein an aluminide coating for the bonding agent coating.

37. A multi-layer thermal barrier coating system according to claim 20, wherein said second layer substantially or entirely comprises a porous ceramic.

38. A multi-layer thermal barrier coating system according to claim 37, wherein said porous ceramic includes yttrium-stabilized zirconium oxide.

39. A multi-layer thermal barrier coating system according to any of claim 20, wherein an interface between the first layer and the second layer has a roughness greater than 4 μm.

40. A multi-layer thermal barrier coating system according to claim 20, wherein said thermal barrier coating is designed for temperatures greater than 800° C.

* * * * *